Aug. 10, 1943.    J. JANDASEK    2,326,655
TURBO TRANSMISSION
Filed Nov. 4, 1940
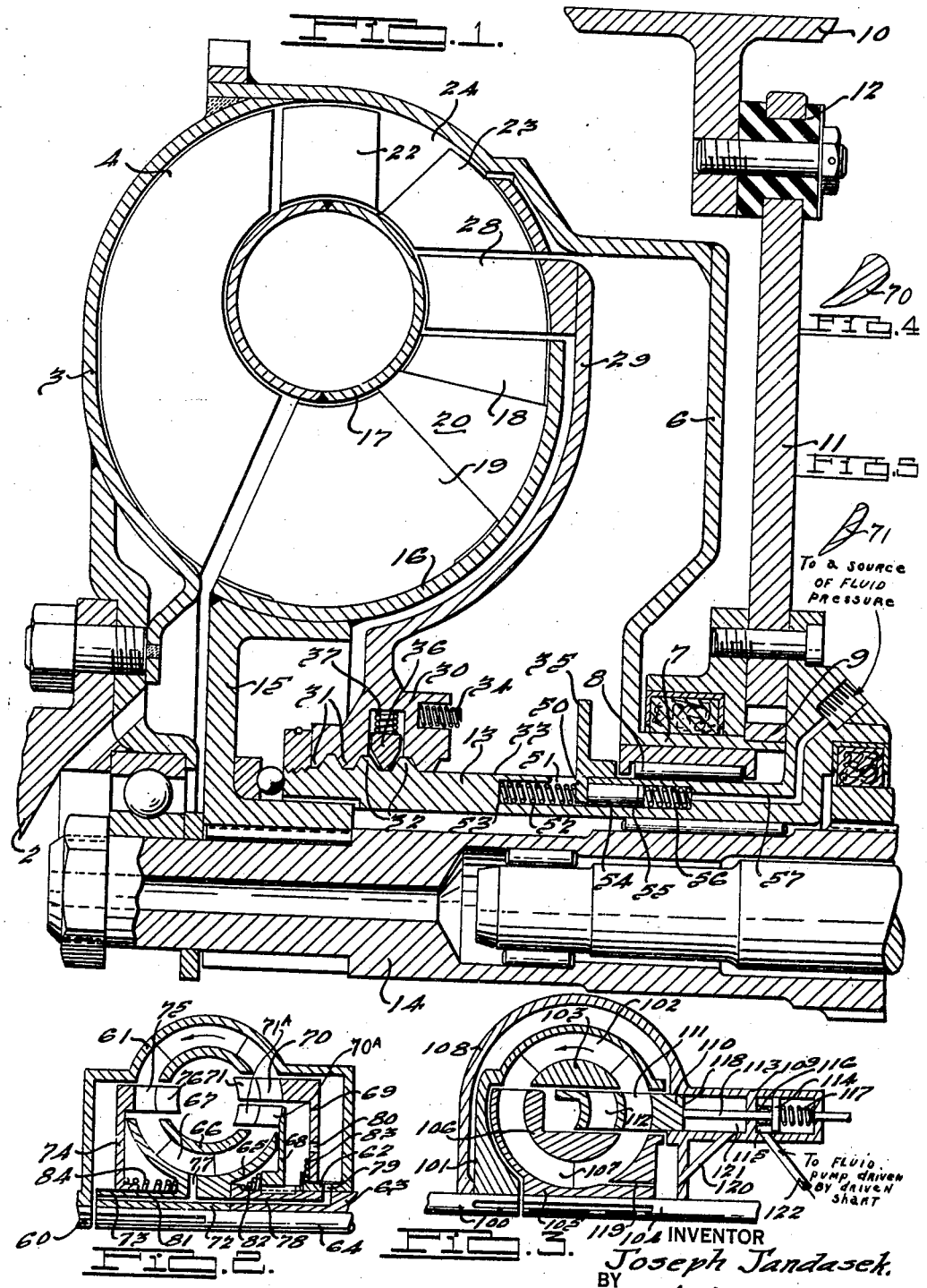
INVENTOR
Joseph Jandasek.
BY
ATTORNEYS Patented Aug. 10, 1943

2,326,655

UNITED STATES PATENT OFFICE 2,326,655

TURBO TRANSMISSION

Joseph Jandasek, Detroit, Mich., assignor to Bendix Aviation Corporation, South Bend, Ind., a corporation of Delaware Application November 4, 1940, Serial No. 364,117

3 Claims. (Cl. 60—54)

This invention relates to transmissions and more particularly to turbo transmissions which may be selectively operated as torque converters or as turbo clutches.

An object of the invention resides in the provision of an axially shiftable blade wheel member operable under the influence of fluid reaction.

A further object resides in the provision of fluid pressure actuated means to initiate movement of the guide wheel member to transform the device from a turbo clutch to a torque converter.

Another object of the invention resides in the making of blades in spaced sections wherein the first group may be formed of closely spaced contoured rectifying blades and the second group may be formed of more widely spaced relatively thin cross section blades.

A further object of the invention resides in the provision of angularly disposed friction means associated with an axially extending helix member to direct an axially movable member in opposite directions depending on the direction of rotation of said member to selectively operate the device as a torque converter or as a turbo clutch.

Yet a still further object of the invention resides in the provision of a resiliently mounted guide wheel member.

Still another object is to provide pressure responsive means controlled by the fluid pressure developed within the unit and influenced by pressure developed by rotation of a driven shaft to control the position of a guide wheel member.

Another object of the invention resides in the provision of a plurality of independently operable reaction members to selectively transform a turbo unit from a torque converter to a turbo clutch dependent on the speed of operation and the load to which the unit is subjected.

A still further object is to provide a plurality of axially movable reaction members which may independently move into and out of a fluid circuit to vary the torque multiplication transmitted by the device.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a longitudinal sectional view of a transmission device embodying the present invention.

Fig. 2 is a longitudinal sectional view of a device embodying a modified form of the invention.

Fig. 3 is a longitudinal sectional view of a device embodying a further modified form of the invention.

Fig. 4 is a sectional view of an entrance vane for operation at heavy loads.

Fig. 5 is a sectional view of an entrance vane for operation at light loads.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring now to the embodiment of the invention illustrated in Fig. 1, it will be observed that a driving shaft 2 is operably connected to an impeller housing 3. The impeller housing 3 is provided with impeller vanes 4 and terminates in a radially extending flange 6 having an axially disposed portion 7 mounted on suitable bearing means 8. The axially disposed portion 7 is provided with a gear 9 which cooperates with a suitable pinion to form a fluid pump.

A stationary frame or bell housing 10 may be employed as a support or anchor for the turbo unit. A radially extending flange or spider member 11 may be suitably connected to the frame 10 by means of suitable resilient bushings 12. The flange or spider 11 may be provided with an axially extending sleeve 13 preferably concentrically mounted relative to the driving shaft 2 and surrounding a driven shaft 14.

The driven shaft 14 is provided with a radially extending web 15 which terminates in a turbine web 16. A turbine shroud 17 is suitably attached to the turbine web 16 by means of rectifying vanes 18 and main vanes 19. The vanes 18 and 19 are preferably spaced apart to provide a vortex chamber 20 between the vanes. The rectifying vanes 18 are preferably contoured and relatively closely spaced to rectify the flow of the fluid and transmit it to the vortex chamber 20 and the main vanes 19 in streamlines and with minimum turbulence. The turbine shroud 17 is also provided with rectifying vanes 22 and main vanes 23 spaced apart to provide a free vortex chamber 24 therebetween.

In the operation of this device energy is imparted to a fluid by means of the impeller vanes 4, and the energy transmitted to the fluid is absorbed by the first stage turbine vanes 22 and 23 and the second stage turbine vanes 18 and 19 and is transmitted through the turbine web 16 and the radially extending web 15 to the driven shaft 14.

Interposed preferably between the first stage turbine vanes 22 and 23 and the second stage turbine vanes 18 and 19 is an axially shiftable guide wheel member 28 having suitable reaction vanes. The guide wheel 28 is preferably carried by an axially shiftable web member 29 suitably mounted on the stationary sleeve 13.

The guide wheel web 29 preferably terminates in a hub 30 having internal helical threads 31 which cooperate with external helical threads 32 carried by the stationary sleeve 13. The external threads 32 are of approximately the same axial length as the hub 30. The stationary sleeve 13 is provided with a smooth exterior portion 33 of slightly greater length than the hub 30 whereby the hub 30 may shift axially relative to the stationary sleeve 13 to disengage the external threads 32 and rotate freely on the portion 33 of the sleeve 13.

Suitable resilient means 34 carried by the hub 30 may be provided to engage an axially movable flange 35 carried by the sleeve 13 to yieldingly urge the hub 30 towards engagement with the external helical threads 32 under certain operating conditions. A block 36 carried by the hub 30 and resiliently urged into engagement with the stationary sleeve 13 by any suitable means such for example as a spring 37 may be provided, if desired, to assist the spring 34 in moving the hub 30 into engagement with the end of the external helical threads 32 to operate the device as a torque converter or to yieldingly urge the hub 30 longitudinally of the sleeve 13 towards the flange 35 to operate the device as a turbo clutch, dependent on the direction of rotation between the hub 30 and the stationary sleeve 13. This longitudinal movement of the hub 30 is transmitted by the block 36 by reason of the fact that the block 36 is disposed at an angle to the sleeve 13 and to the hub 30.

The flange 35 which is axially movable on the sleeve 13 may be formed with a plurality of projections 50 which may be received in slots 51 formed in the sleeve 13. Yielding means such for example as springs 52 received in slots 53 formed in the sleeve 13 may be provided to yieldingly urge the flange 35 towards one extreme position.

Means may be provided to urge the flange 35 axially towards the threads 32 of the sleeve 13 to initiate axial movement of the hub 30 and guide wheel 28 to transform the device from a turbo clutch to a torque converter. One suitable means for actuating the flange 35 comprises a plurality of spaced plungers 54 slidably mounted in cylinders 55 formed in the sleeve 13. Suitable resilient means such for example as springs 56 may be employed to yieldingly urge the plungers 54 into engagement with the flange 35. The plungers 54 may be actuated by fluid pressure admitted to the cylinders 55 by way of a port 57 which may communicate with engine vacuum, or with a hydraulic brake unit, or with manually operable pressure inducing means.

In the operation of this device when the load is initially applied to the device, the guide wheel 28 may be positioned in the fluid circuit as illustrated whereupon the device will operate as a torque converter to transmit increased torque at lower speed. When the relative speed of operation of the impeller and turbine members approaches a substantially predetermined value, preferably accompanied by a slight decrease in the load transmitted, the fluid reaction exerted on the vanes of the guide wheel 28 will rotate the guide wheel 28 and the web 29 relative to the stationary sleeve 13. The helical threads 31 and 32 carried by the hub 30 and sleeve 13 will move the web 29 and guide wheel 28 axially out of the fluid circuit thereby transforming the unit from a torque converter to operate as a turbo clutch to transmit power at a substantially 1:1 ratio with substantially no torque multiplication. The drag or friction of the fluid on the guide wheel member including the web 29 is sufficient to rotate the guide wheel and thereby to hold the guide wheel member out of the circuit against the resistance of the spring 34.

When the device thus operates as a turbo clutch the internal threads 31 of the hub 30 engage the surface 33 of the sleeve 13 to rotate freely thereon in the forward direction, the block 36 resiliently urging the hub 30 away from the threads 32 of the sleeve 13.

The ends of the external threads 32 adjacent the flange 35 and the internal ends of the helix 31 of the hub 30 may be tapered as illustrated in Fig. 2 of my copending application Serial No. 364,116, filed concurrently herewith, to facilitate reengagement of the hub with the external thread 32 when the fluid reaction in the circuit tends to move the guide wheel in the opposite direction to transform the unit from a turbo clutch to a torque converter.

The operation of the device when the port 57 communicates with the intake manifold is as follows: At idling speed when the engine develops high vacuum in the manifold, suction is exerted on the plungers 54 to retract them in the cylinders 55 whereupon the springs 52 urge the flange 35 towards the position shown in Fig. 1. When the engine is accelerated the vacuum drops and springs 56 urge the plungers 54 and flange 35 towards the threads 32 of the sleeve 13 whereupon the flange 35 engages the hub 30 to urge the guide wheel towards the threads 32. When the threads 31 and 32 engage, the reaction of the fluid exerted on the guide wheel rotates the hub 30 relative to the sleeve 13 to introduce the guide wheel into the fluid circuit whereupon the device is transformed from a turbo clutch to a torque converter.

When the port 57 is connected to the brake system the springs 52 and 56 should be calibrated in such a manner that the spring 52 overcomes the resistance of spring 56 to hold the flange 35 in the retracted position illustrated.

With the device operating as a turbo clutch with the guide wheel 28 withdrawn from the fluid circuit, the hub 30 will rotate freely on the section 33 of the sleeve 13. When the brakes are applied fluid pressure will be transmitted through the port 57 to urge the plungers 54 into engagement with the flange 35 whereupon the flange 35, the hub 30 and the guide wheel 28 are moved toward the left as viewed in Fig. 1 to engage the internal threads 31 with the external threads 32. Fluid reaction exerted on the guide wheel will then rotate the guide wheel and hub 30 relative to the sleeve 13 to the position illustrated in Fig. 1 whereupon the device will be transformed from a turbo clutch to a torque converter to transmit power at high torque multiplication, or to permit the turbo unit to be used as an auxiliary brake.

When the brakes are released the guide wheel will remain in the fluid circuit until the speed of the turbine and pressure in the fluid circuit approach a substantially predetermined relation whereupon the guide wheel 28 will be withdrawn from the fluid circuit to transform the device to again operate as a turbo clutch.

In the embodiment of Fig. 2 a driving shaft 60 is provided with an impeller housing 61 which terminates in an axially extending portion 62 surrounding a stationary sleeve 63 concentrically mounted relative to a driven shaft 64. A turbine web 65 is fixed to the driven shaft 64 and cooperates with a turbine shroud 66 to position suitable turbine vanes 67 in the fluid circuit.

The guide wheel flange 68 and the auxiliary impeller flange 69 each have a plurality of axially spaced vane portions 70 and 71, and 70a and 71a respectively, adapted to be positioned in the fluid circuit mounted on the stationary sleeve 63, and the axially extending portion 62 of the impeller housing 61 respectively in such a manner that the auxiliary impeller flange 69 may rotate with the axially-extending portion 62 of the impeller housing 61, and the guide wheel flange 68 will be held against rotation on the stationary sleeve 63. The turbine web 65 terminates in a turbine hub 72 having an axially extending portion 73 surrounding the driven shaft 64. A flanged member 74 axially movable relative to the axially extending portion 73 but rotatable therewith is provided with a plurality of spaced vane portions 75 and 76 adapted to be positioned in the fluid circuit between the impeller and turbine members. The vanes 70, 70a and 75 are designed with relatively thick contours having considerable curvature as illustrated in Fig. 4 for operation at heavy loads and low speeds. The vanes 71, 71a and 76 are designed with relatively thin contours with little or no curvature for operation at light loads and high speeds.

The flange 69 is carried by the impeller member and in such a manner as to rotate therewith and be axially shiftable into or out of the fluid circuit to introduce an auxiliary fluid energizing member into the circuit. The flange 69 carries a plurality of spaced vaned portions 70 and 71 having vanes of varying contour positioned at varying angles to control the amount of power transmitted to the fluid at varying speeds.

A fluid passageway 77 extends from the space between the turbine web 65 and the turbine shroud 66 and communicates with a passageway 78 extending axially in the turbine hub 73 and stationary member 63. A port 79 in the portion 62 of the impeller housing interconnects the conduit 78 with the space behind the auxiliary impeller flange 69 whereupon the flange 69 may be subjected to fluid pressures developed in the fluid circuit. An aperture 80 extending through the auxiliary impeller flange 69 permits the fluid to pass through the flange 69 to be exerted upon the rear face of the guide wheel flange 68.

The passageway 77 also communicates with a passageway 81 extending lengthwise of the turbine hub 73 to subject the back surface of the flange 74 to fluid pressure developed in the turbine fluid channel.

When the device is operating as a turbo clutch to transmit power at a substantially 1:1 ratio, the pressure developed within the turbine fluid channel is relatively low and the springs 82 and 83 respectively urge the guide wheel flange 68 and the auxiliary impeller flange 69 axially relative to their associated members to position the spaced vane portions 71A and 71 respectively in the fluid circuit. A spring 84 will likewise urge the flange 74 axially on the hub 73 to position the vane portion 76 in the fluid circuit.

When the turbine becomes overloaded due to the transmission of increased torque, the fluid pressure in the turbine channel increases whereupon fluid pressure is transmitted through the passageway 77, conduit 78 and ports 79 and 80 to move flanges 69 and 68 to position the vane portions 70 and 70a respectively in the fluid circuit thereby transforming the device from a turbo clutch to operate as a torque converter. Fluid pressure is also transmitted through the passageway 81 to urge the flange 74 axially to position the vane portion 75 of the turbine member in the fluid circuit, whereupon increased power may be absorbed from the fluid and transmitted to the driven shaft 64.

In the embodiment of Fig. 3, a driving shaft 100 is provided with an impeller web 101 having suitable impeller vanes 102 interposed between the web 101 and an impeller shroud 103. A driven shaft 104 is preferably coaxially aligned with the driving shaft 100 and is provided with a turbine web 105 spaced from a turbine shroud 106 by suitable vanes 107. A stationary housing 108 is preferably mounted on the driving and driven shafts 100 and 104 respectively, and houses a cylinder 109 which receives a guide wheel member 110.

The guide wheel member 110 is provided with a plurality of spaced passageways 111 and 112 adapted to operate the device as a torque converter or as a turbo clutch respectively depending on which passageway is in the fluid circuit. The guide wheel member 110 is provided with a stem 113 having a piston 114 slidably mounted in a cylinder 115 and yieldingly urged in opposite directions by calibrated springs 116 and 117 respectively, cooperating with the forces exerted by the fluid on the vanes, and the forces to which the piston 114 is subjected whereby the position of the guide wheel member may be controlled.

The back surface 118 of the guide wheel member 110 may be subjected to fluid pressure developed in the turbine by means of a passageway 119 and a conduit 120 which interconnects the turbine channel with a cylinder 121. A conduit 122 preferably interconnects a portion of the cylinder 115 with a source of fluid pressure which varies with variations of speed of the driven shaft 104.

The operation of this device is as follows: When the unit is operating as a turbo clutch the pressure in the turbine circuit is relatively low, the passageway 112 of the guide wheel will be positioned in the fluid circuit. When the torque transmitted increases, the pressure developed in the turbine channel increases whereupon the surface 118 of the guide wheel member 110 will be subjected to increased pressure in the cylinder 121 by reason of the fact that the passageway 119 and conduit 120 interconnect the turbine channel with the cylinder 121. As the device tends to slow down due to the transmission of increased torque at slower speed, the pressure developed by rotation of the driven shaft 104 and transmitted through the conduit 122 decreases whereupon the spring 117 overcomes the resistance of the spring 116 and adds a force to the force exerted against the surface 118 of the guide wheel member 110 to move the guide wheel member 110 relative to the fluid circuit to position the passageway 111 in the fluid circuit thereby transforming the device from a turbo clutch to operate as a torque converter to transmit power at higher torque multiplication and at slower speed.

When the load transmitted by the device decreases the fluid pressure in the turbine channel decreases correspondingly. The fluid pressure transmitted to the cylinder 121 through the passageway 119 and conduit 120 also decreases proportionately to a decrease of pressure in the turbine. As the load transmitted by the device decreases the pressure in the chamber 115 increases due to more rapid rotation of the driven shaft 104. The guide wheel member 110 is then shifted axially to position the passageway 112 in the fluid circuit by the differential of forces exerted on the stem 113 to transform the device from a torque converter to operate as a turbo clutch to transmit power at a substantially 1:1 ratio.

It is to be understood that various features disclosed in different views of this application may be substituted for corresponding portions of other views without departing from the spirit of my invention.

This application is a continuation-in-part of my co-pending application Serial No. 588,163, filed January 22, 1932, now Patent No. 2,222,618, issued November 26, 1940. Features disclosed but not claimed herein are being claimed in my co-pending application, Serial Number 454,829, filed August 14, 1942.

I claim:

1. In a turbo transmission for a vehicle, a driven shaft, an axially extending stationary member concentrically mounted relative to the driven shaft, a fluid circuit, a guide wheel mounted on the stationary member and movable axially thereon into or out of the fluid circuit to operate the transmission as a torque converter or as a turbo clutch, cooperating means comprising an internally threaded guide wheel hub and a threaded segment on the stationary member whereby the guide wheel may be locked against rotation in the fluid circuit or shifted axially on the stationary member to withdraw the guide wheel from the fluid circuit to selectively operate the device as a torque converter or as a turbo clutch, a movable flange mounted on the stationary member and positioned to engage the hub, and fluid pressure actuated means operable while the device is in operation as a turbo clutch to move the flange and hub relative to the stationary member to introduce the guide wheel into the circuit to transform the device to operate as a torque converter.

2. A turbo transmission for a motor driven vehicle comprising driving and driven shafts, an impeller operably connected to the driving shaft, a turbine operably connected to the driven shaft, the impeller and turbine cooperating to form a fluid circuit, a stationary member, a guide wheel associated with the fluid circuit and having a hub movably mounted on the stationary member to move the guide wheel into and out of the fluid circuit to selectively operate the transmission as a torque converter or as a turbo clutch, means including cooperating helical threads carried by the guide wheel hub and said stationary member whereby the guide wheel may be locked against rotation in the fluid circuit when the device is operating as a torque converter and may be withdrawn from the fluid circuit and released to rotate when the device is operating as a turbo clutch, a movable flange associated with the stationary member and positioned to engage the guide wheel hub when the device is operating as a turbo clutch, and fluid pressure actuated means to move the flange to initiate movement of the hub to introduce the guide wheel into the fluid circuit thereby transforming the device from a turbo clutch to operate as a torque converter.

3. A turbo transmission for a vehicle comprising a driving shaft, an impeller wheel operably connected to the driving shaft, a driven shaft, a turbine wheel operably connected to the driven shaft, the impeller and turbine wheels cooperating to form a fluid circuit, a guide wheel associated with the fluid circuit, a stationary member having a helically threaded portion, means associated with the guide wheel and stationary member comprising a guide wheel hub having internal helical threads cooperating with the helically threaded portion of the stationary member to restrain the guide wheel from rotation in the fluid circuit to operate the device as a torque converter or to withdraw the guide wheel from the fluid circuit to operate the device as a turbo clutch, a movable flange mounted on the stationary member and positioned to engage the guide wheel hub when the device is operating as a turbo clutch, and manually operated fluid pressure actuated means to move the flange and hub to initiate movement of the guide wheel into the fluid circuit, and fluid reaction responsive means operable after said initial movement has been effected to introduce the guide wheel into the fluid circuit to transform the device to operate as a torque converter.

JOSEPH JANDASEK.